(12) United States Patent
Sagara (10) Patent No.: US 8,351,096 B2
(45) Date of Patent: Jan. 8, 2013

(54) IMAGE SCANNING UNIT (75) Inventor: Masao Sagara, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 967 days.

(21) Appl. No.: 12/382,434

(22) Filed: Mar. 17, 2009

(65) Prior Publication Data

US 2009/0231636 A1 Sep. 17, 2009

(30) Foreign Application Priority Data

Mar. 17, 2008 (JP) .................. 2008-068582

(51) Int. Cl.
 *H04N 1/00* (2006.01)
(52) U.S. Cl. ........ 358/496; 358/3.26; 358/474; 399/379
(58) Field of Classification Search .............. 358/3.26, 358/474, 496; 399/379
See application file for complete search history.

(56) References Cited

U.S. PATENT DOCUMENTS

| 7,982,926 B2 * | 7/2011 | Ishikawa et al. ............ 358/496 |
| 2003/0072041 A1 * | 4/2003 | Sawada .................... 358/494 |

FOREIGN PATENT DOCUMENTS

| JP | 62-219748 | 9/1987 |
| JP | 62-262563 | 11/1987 |
| JP | 5-34770 | 5/1993 |
| JP | 2897690 | 3/1999 |
| JP | 2897690 | 12/1999 |
| JP | 2005-260831 | 9/2005 |
| JP | 2006-201310 | 8/2006 |

OTHER PUBLICATIONS

Abstract of JP 09-002700 published Jan. 7, 1997.
Office Action dated Mar. 12, 2012 issued in corresponding Chinese Application No. 200910126592.0.

* cited by examiner

*Primary Examiner* — King Poon
*Assistant Examiner* — Lawrence Wills
(74) *Attorney, Agent, or Firm* — Harness, Dickey & Pierce, P.L.C.

(57) ABSTRACT

An image scanning unit includes a translucent member, a transport unit, and a scan device. The translucent member has a flat face on which a document is contactingly transported by the transport unit while contacting the document against the translucent member. The scan device scans image information of the document transported by the transport unit at a scan position, and is fixedly disposed on a side of the translucent member opposite a side on which the document contacts the flat face of the translucent member. The translucent member includes a convex portion to lift the document transported by the transport unit from the flat face of the translucent member. The scan device scans the document at the scan position when the document transported by the transport unit passes over the convex portion and is still lifted from the flat face of the translucent member by the convex portion.

5 Claims, 5 Drawing Sheets

IMAGE SCANNING UNIT

CROSS-REFERENCE TO RELATED APPLICATIONS

This application claims priority under 35 U.S.C. 119(a) to Japanese Patent Application No. 2008-068582, filed on Mar. 17, 2008 in the Japan Patent Office, the entire contents of which are hereby incorporated by reference herein.

BACKGROUND OF THE INVENTION

1. Field of the Invention

The present disclosure generally relates to an image scanning unit for scanning documents.

2. Description of the Background Art

Typically, an image scanning unit employs a document-moving scanner to scan the document and create an image thereof. In such document-moving scanner, a document transported along a contact glass may be scanned by an optical scanning unit, which is fixed at a given position. If foreign matter accumulates on a document scan position of the optical scanning unit, such foreign matter may be scanned as well, and the whole document appear as an abnormal image (e.g., streaked, etc.), thus degrading image quality.

In view of such drawbacks, JP-S62-262563-A discloses an optical scanning unit having a contact-type image sensor, in which a groove is formed at a document scan position of a translucent protective layer of the contact-type image sensor and a document contacts the translucent protective layer. With such a configuration, adhesion of ink on the document to a document scan position of the translucent protective layer can be prevented, and scanned image quality can be enhanced.

Further, JP-2897690-B discloses another image sensor unit in which a document scan surface made of a transparent glass includes a convex portion and a concave groove. The convex portion having a given uniform width extends in a direction perpendicular to a document transport direction, and the concave groove is formed parallel to the convex portion and closer to a document insertion side of the unit. The document is transported from the concave groove to the convex portion on the document scan surface and is scanned when the document passes a flat top of the convex portion.

In the image sensor unit described above, excess ink on the document can be scraped away at a base portion of the concave groove and the convex portion, by which adhesion of ink to a document scan position onto the convex portion can be prevented. With such a configuration, document image may be scanned with higher quality.

However, the above-described methods might have room for improvement. For example, in JP-S62-262563-A, with the groove formed at a scan position, ink or foreign matter (e.g., dust) on the document may be scraped at a corner-portion of the groove and accumulate in the groove, and thereby an abnormal image may occur inadvertently.

In JP-2897690-B, ink or foreign matter (e.g., dust) on the document may be scraped at the base portion of the concave groove and the convex portion, and the top face (or document scan surface) of the convex portion contacts the document in such condition. If foreign matter (e.g., unfixed toner) still adheres to the document, the top face (or document scan surface) of the convex portion may be contaminated by the foreign matter, by which an abnormal image may occur inadvertently.

Such contamination of the document scan surface may be prevented by forming a number of concave grooves therein, but such configuration may not be practical given the cost of manufacture.

SUMMARY

In one aspect of the present invention, an image scanning unit includes a translucent member, a transport unit, and a scan device. The translucent member has a flat face on which a document is contactingly transported. The transport unit transports the document on the flat face of the translucent member while contacting the document against the translucent member. The scan device scans image information of the document transported by the transport unit at a scan position of the image scanning unit. The scan device is fixedly disposed on a side of the translucent member opposite a side on which the document contacts the flat face of the translucent member, and extends in a main scanning direction perpendicular to a transport direction of the document longer than a width of the document to be scanned. The translucent member includes a convex portion extending in a main scanning direction to lift the document transported by the transport unit from the flat face of the translucent member as the document passes the convex portion. The scan device scans the document at the scan position when the document transported by the transport unit passes over the convex portion and is still lifted from the flat face of the translucent member by the convex portion.

In another aspect of the present invention, an image scanning unit includes a translucent member, transport means, and scanning means. The translucent member has a flat face on which a document is contactingly transported. The transport means transports the document on the flat face of the translucent member while contacting the document against the translucent member. The scanning means scans image information of the document transported by the transport means at a scan position of the image scanning unit. The scanning means is fixedly disposed on a side of the translucent member opposite a side on which the document contacts the flat face of the translucent member, and extends in a main scanning direction perpendicular to a transport direction of the document longer than a width of the document to be scanned. The translucent member includes a convex portion extending in a main scanning direction to lift the document transported by the transport means from the flat face of the translucent member as the document passes the convex portion. The scanning means scans the document at the scan position when the document transported by the transport means passes over the convex portion and is still lifted from the flat face of the translucent member by the convex portion.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict example embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXAMPLE EMBODIMENTS

A description is now given of example embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing expanded views shown in the drawings, specific terminology is employed for the sake of clarity, the present disclosure is not limited to the specific terminology so selected and it is to be understood that each specific element includes all technical equivalents that operate in a similar manner.

Referring now to the FIG. 1 to FIG. 5, an image forming apparatus according to an example embodiment is described. The image forming apparatus may employ electrophotography, for example, and may be used as a copier, a printer, a facsimile, or a multi-functional apparatus, but not limited thereto.

Figure 1:
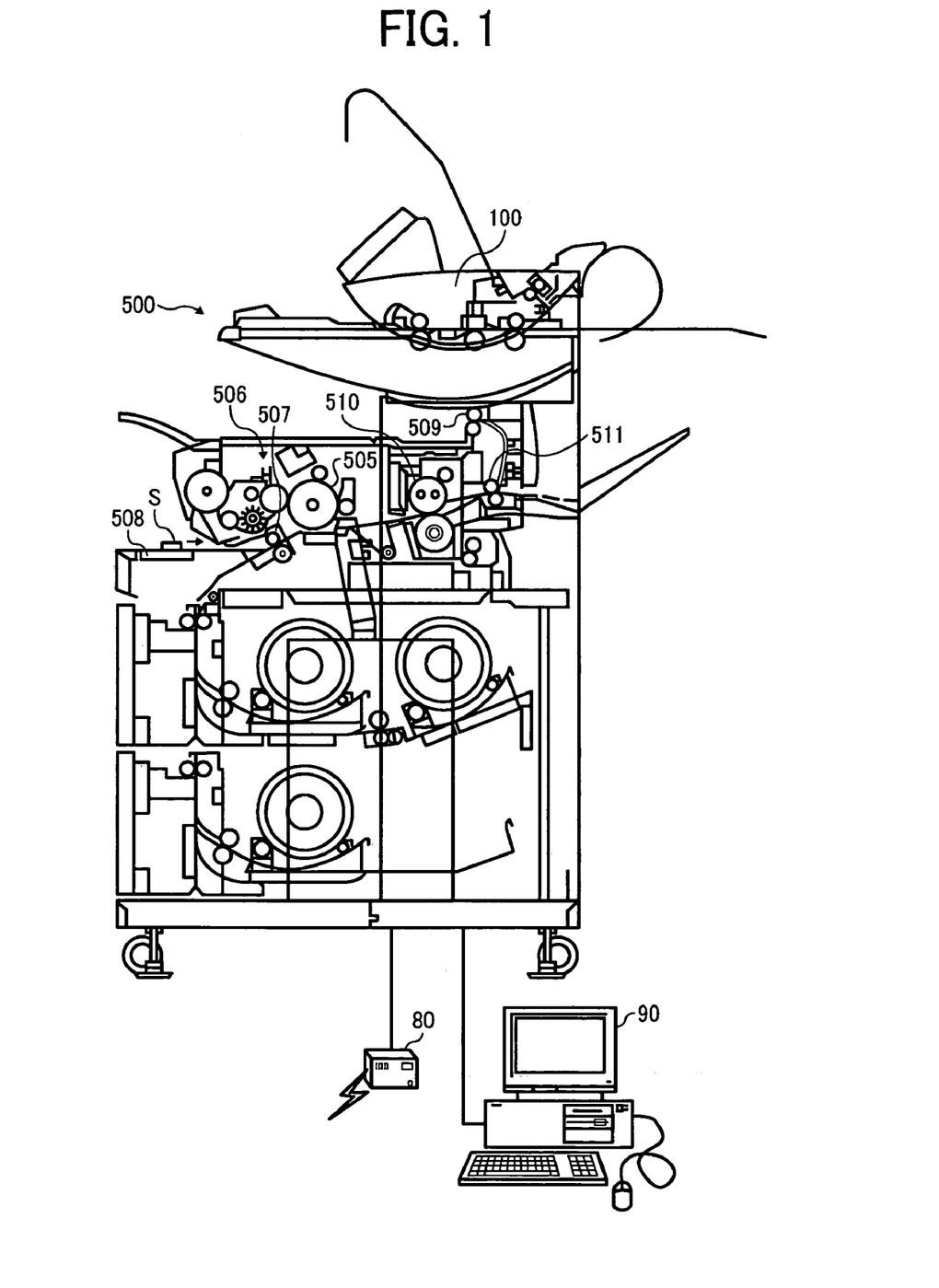
FIG. 1 illustrates a schematic configuration of an image forming apparatus according to a first exemplary embodiment.

FIG. 1 illustrates a schematic view of an image forming apparatus 500 employing an image scanning unit according to a first exemplary embodiment.

The image forming apparatus 500 may be devised to process wide-width sheets (e.g., A1, A0 sheet), but not limited to these.

The image forming apparatus 500 may include an image scanning unit 100, an image forming unit 506, a fixing unit 510, and a sheet feed table 508 under the image scanning unit 100, for example. The image forming unit 506 includes a photoconductor 505, and a development unit, for example. A sheet S set on the sheet feed table 508 is fed to a registration roller 507, and is then stopped for some time by the registration roller 507. Then, the sheet S is fed to the image forming unit 506 at a give timing. The sheet feed table 508 may be an automatic sheet feeder or a manual sheet feeder, for example.

In the image forming unit 506, a latent image corresponding to image data is formed on the photoconductor 505, and the latent image is developed as a toner image by the development unit. The toner image is transferred from the photoconductor 505 to the sheet S at a transfer nip, and fixed on the sheet by a fixing unit 510. After fixing the toner image on the sheet by the fixing unit 510, the sheet S is ejected outside of the image forming apparatus 500 using a sheet ejection roller 511.

The image forming apparatus 500 may be connected to a PBX (private branch exchange) 80 and an external apparatus 90 (e.g., personal computer). Such image forming apparatus 500 may conduct functions such as an image scanning function, a printing function, a copying function, and a facsimile function, for example, using the above-mentioned units. For example, the image forming apparatus 500 may communicate with an external facsimile machine via the PBX 80 or with the external apparatus 90 to transmit or receive image data.

Figure 2:
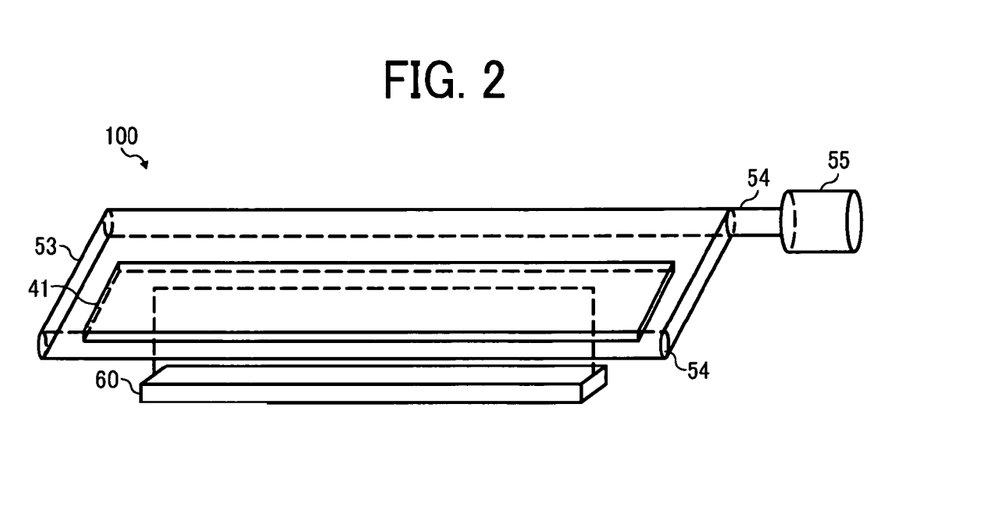
FIG. 2 illustrates a perspective view of a contact glass and a contact-type image sensor shown in FIG. 1.

Further, as shown in FIG. 2, the image scanning unit 100 includes a contact glass 41 (e.g., translucent member) on its top, and a contact image sensor 60 under the contact glass 41. The contact image sensor 60 is disposed under the contact glass 41 of the image scanning unit 100 to scan images of a document G transported on the contact glass 41. The contact image sensor 60 may be arranged at a given position where the document G contacts the contact glass 41.

As shown in FIG. 2, the contact image sensor 60 may be extended in a direction perpendicular to a transport direction of the document G (or main scanning direction) for a given length. The contact image sensor 60 may be single image sensor, or a plurality of image sensors arranged in the main scanning direction. When the plurality of image sensors are arranged, the image sensors need to be arranged in a given manner so that no image scanning-blank area is provided between adjacent image sensors.

Figure 3:
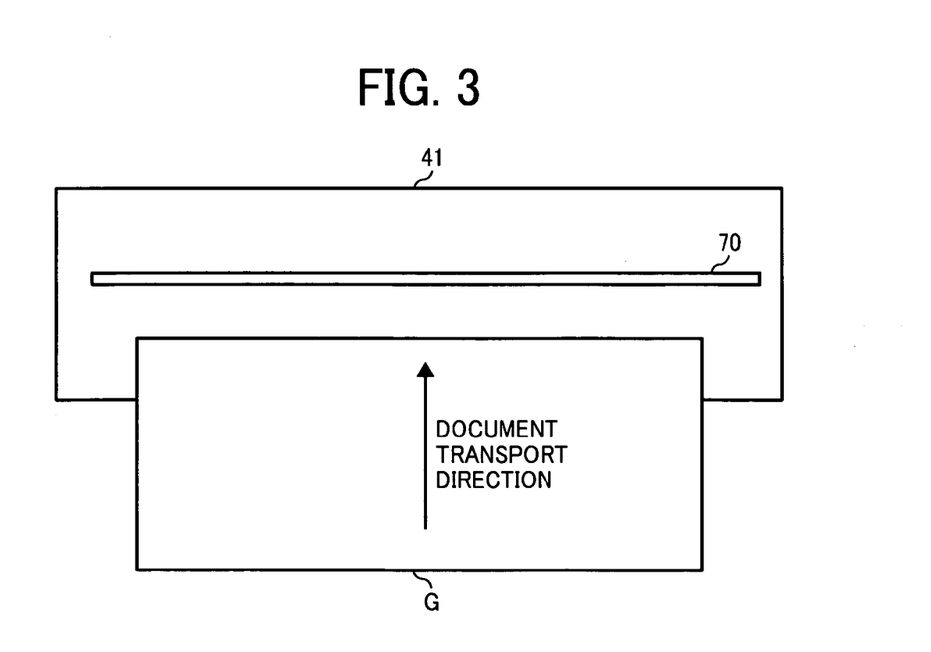
FIG. 3 illustrates a plan view of the contact glass of FIG. 2.
Figure 4:
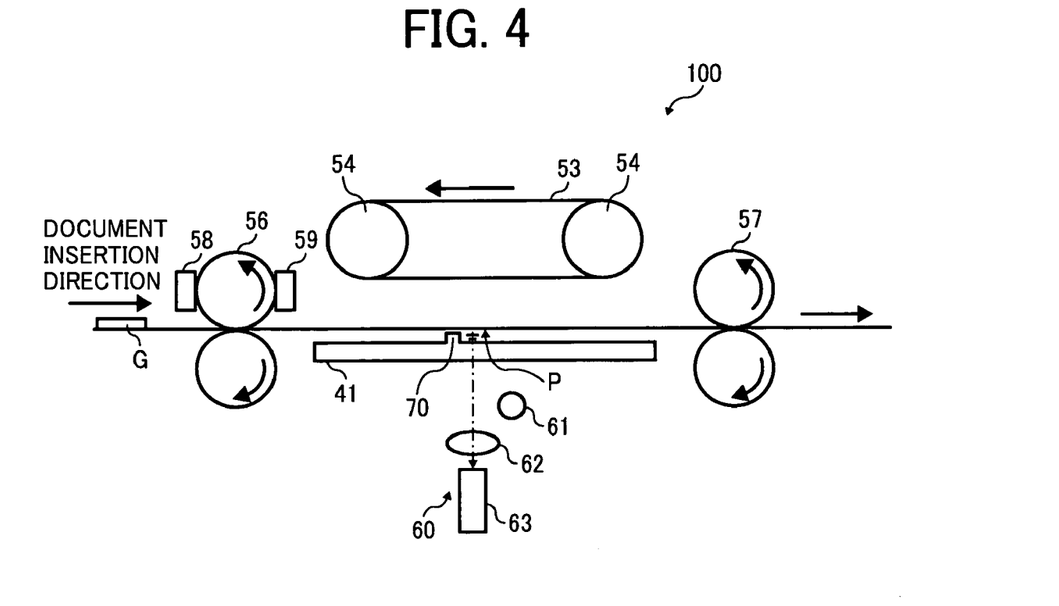
FIG. 4 illustrates a schematic configuration of an image scanning portion of FIG. 3.
Figure 5:
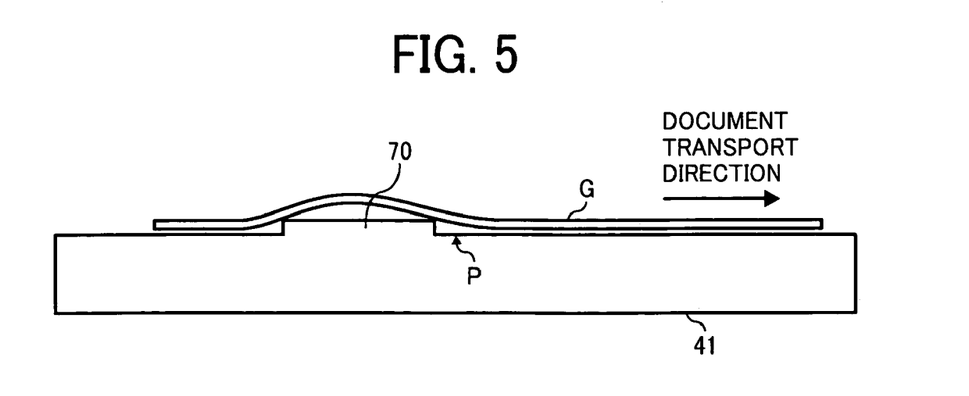
FIG. 5 illustrates an expanded view of convex portion of the contact glass of FIG. 4.

The contact glass 41 may have a flat face on which the document G is transported. Although the contact glass 41 may be flat in most of its part, as shown in FIGS. 3, 4, and 5, the flat face of the contact glass 41 may also be provided with a convex portion 70 near a document scan position P of the contact image sensor 60. The convex portion 70 is provided at a given position corresponded to an arrangement position of the contact image sensor 60.

For example, the convex portion 70 may be shaped in a rectangular bar shape having corner edges, in which the corner edges may face an upstream side and a downstream side of document transport direction as shown in FIGS. 4 and 5.

As shown in FIGS. 2 and 4, the image scanning unit 10 may further include a belt 53, rollers 54, and a motor 55, in which the belt 53 is looped by the rollers 54, and one of the rollers 54 is used as a drive roller driven by the motor 55, and the other roller 54 is used as s driven roller so that the feed belt 53 can be moved in a given direction by the rollers 54. For example, the belt 53 can be rotated in a counter-clockwise direction as shown in FIG. 4, by which the document G can be transported on the contact glass 41 reliably. The belt 53 may have a white face to provide a reference white color level for conducting a shading correction of the contact image sensor 60.

Further, as shown in FIG. 4, the image scanning unit 10 may further include a sheet-in transport roller 56 and a sheet-out transport roller 57 disposed outside the contact glass 41. The sheet-in transport roller 56 is disposed at a document-in side relative to the document scan position P for the contact image sensor 60. The sheet-out transport roller 57 is disposed at a document-out side relative to the document scan position P for the contact image sensor 60.

The sheet-in transport roller 56 is provided with a document insertion sensor 58 in an upstream of the document transport direction of the sheet-in transport roller 56, and a registration sensor 59 in a downstream of the document transport direction of the sheet-in transport roller 56.

The document insertion sensor 58 detects a leading edge of the document G transported from the sheet feed table 508. The registration sensor 59 detects the leading edge of the document G, transported by the sheet-in transport roller 56 toward the document scan position P.

As such, the belt 53, the rollers 54, the motor 55, the sheet-in transport roller 56, and the sheet-out transport roller 57 can be used to transport the document G to the contact glass 41 while contacting the document G on the contact glass 41.

As shown in FIG. 4, the contact image sensor 60 includes a light source 61, a lens 62, and an image sensor 63, for example, which are encased in a casing. The light source 61 emits a light beam to the document scan position P on the document G via the contact glass 41. A reflected light reflected from the document G is focused on the image sensor 63 using the lens 62. The image sensor 63 converts the reflected light to electrical signals to read information of document image. Accordingly, a photoelectric conversion is conducted for image data.

As shown in FIG. 5, the document scan position P is disposed at a downstream side of the document transport direction relative to the convex portion 70, which means the document G is scanned after passing the convex portion 70. The document scan position P can be set at a position between the corner-portion of the convex portion 70 at a downstream side of the document transport direction and a landing position of the document G that the document G lands on the flat face of the contact glass 41.

Accordingly, the document G can be kept at a non-contact condition with the flat face of the contact glass 41 between the corner-portion of the convex portion 70 and the landing position of the document G. Such non-contact portion of the document G may be referred as a "document lifted portion." Accordingly, the document G can be lifted from the contact glass 41 using stiffness of document G, which may be determined by sheet quality. If a sheet is paper, paper quality of stiffness may effect to the document lifted portion.

Because the document scan position P can be set at a position corresponding to the document lifted portion of the document G, foreign matter (e.g., not-fixed toner, dust) on the document G may not adhere the document scan position P, by which document images can be scanned with higher quality while reducing occurrence of abnormal image (e.g., streak-like image) caused by foreign matter.

A height of the document lifted portion may vary depending on sheet quality of the document G. For example, even if the document G has a smaller stiffness, the document G may not closely face a wall face of the convex portion 70 at a downstream side of the document transport direction. Accordingly, the document G can be transported from the corner-portion of the convex portion 70 at a downstream side of the document transport direction to the flat face of the contact glass 41 while setting the document lifted portion.

Accordingly, the document scan position P can be set in the document lifted portion even if the document G has a smaller stiffness.

Further, the convex portion 70 can be formed to have a given height which can prevent an out-of-focus condition for image scanning in view of a focal depth of the lens 62 of the contact image sensor 60. Specifically, if a height of the convex portion 70 is too high or too low, an image focused on the image sensor 63 via the lens 62 becomes an out-of-focus condition. Further, the height of the convex portion 70 may be set in view of sheet quality of the document G. Accordingly, the height of the convex portion 70 may be set to a given height that image on the document G can be scanned with high quality for any types of sheet quality without causing out-of-focus condition. For example, the height of the convex portion 70 may be set from 5 μm to 100 μm.

A description is now given image scanning operation of the image forming apparatus 500 according to an exemplary embodiment, in which image on the document G can be scanned with high quality while reducing an effect of foreign matter (e.g., residual toner, foreign matter).

When the document G is placed on the sheet feed table 508, the document G is transported toward the contact glass 41, and further transported to the document scan position P on the contact glass 41. When the document insertion sensor 58 detects a leading edge of the document G, the sheet-in transport roller 56 and the sheet-out transport roller 57 are activated, and the belt 53 is also activated. Further, the light source 61 of the contact image sensor 60 is turned to ON to emit a light beam. When a leading edge of the document G is detected by the registration sensor 59, a time that the leading edge of the document G reaches the document scan position P on the contact glass 41 can be computed based on a signal detected by the registration sensor 59. The image sensor 63 of the contact image sensor 60 starts to scan the document G from the time that the leading edge of the document G reaches the document scan position P.

As shown in FIG. 3, the document G is slidably transported on the contact glass 41 toward the convex portion 70, in which a document face of the document G having image information faces the contact glass 41. When a leading edge of the document G reaches the convex portion 70, the leading edge of the document G is lifted from the flat face of the contact glass 41 by the convex portion 70. Then, the leading edge of the document G passes over the convex portion 70 and lands on the flat face of the contact glass 41. The document G may land on the contact glass 41 by forming a given gradient angle set by a corner-portion of the convex portion 70 at a downstream side of the document transport direction and the flat face of the contact glass 41. The gradient angle may vary depending on sheet quality (e.g., stiffness) of the document G.

When the document G reaches the convex portion 70, the document G may hit against the convex portion 70. Although the convex portion 70 has a given height, the leading edge of the document G may not be stopped by the convex portion 70 because the height of the convex portion 70 can be set to a smaller scale, such as for example from 5 μm to 100 μm. Accordingly, the document G can run on the convex portion 70 easily, and can be transported to the document scan position P.

When the document G runs on the convex portion 70, the document face of the document G is rubbed by a corner-portion of the convex portion 70 at an upstream side of the document transport direction. Accordingly, even if foreign matter (e.g., not-fixed toner, dust) may adhere on the document face, such foreign matter may be scraped by the corner-portion of the convex portion 70, and then the document G, which has a clean face condition, can be transported to the document scan position P.

At the timing when the document G is transported to the document scan position P, the light source 61 emits a light beam to the document scan position P on the document G via the contact glass 41. A reflected light reflected from the document G is focused on the image sensor 63 using the lens 62. The image sensor 63 converts the light to electrical signal to read information of document image. Accordingly, by conducting a photoelectric conversion process for image information, an image scanning process can be conducted.

The document scan position P can be set at a position between the corner-portion of the convex portion 70 at a downstream side of the document transport direction and a landing position of the document G that the document G lands on the flat face of the contact glass 41.

Accordingly, the document G can be in a non-contact condition with the flat face of the contact glass 41 between the corner-portion of the convex portion 70 and the landing position of the document G. Such non-contact portion of the document G may be referred as a "document lifted portion."

Because the document scan position P can be set at a position corresponding the document lifted portion of the document G, foreign matter (e.g., not-fixed toner, dust) on the document G may not adhere the document scan position P, by which images can be scanned with higher quality while reducing occurrence of abnormal image (e.g., streak-like image) caused by foreign matter.

Further, as above described, even if foreign matter (e.g., not-fixed toner, dust) may adhere on the document face of the document G, such foreign matter can be scraped by the corner-portion of the convex portion 70 at the upstream side of the document transport direction, by which the document face of the document G can be set in a clean face condition. Accordingly, the document face of the document G can be scanned effectively, by which image quality of scanned image can be enhanced.

Further, the document scan position P can be set within the document lifted portion of the document G even if the document lifted portion may vary depend on sheet quality of the document G. Accordingly, images on the document G can be scanned with high quality for any types of sheets used as the document G, which means sheet quality may not affect an image scanning operation. Such document may be a paper having smaller stiffness, for example.

Further, the convex portion 70 formed with a given height can prevent an out-of-focus condition for image scanning in view of the focal depth of the lens 62 of the contact image sensor 60. Further, The height of the convex portion 70 may be set in view of sheet quality of the document G. Accordingly, the height of the convex portion 70 can be set to a given height that images on the document G can be scanned with high quality for any types of sheet quality without causing out-of-focus condition. For example, the height of the convex portion 70 may be set from 5 μm to 100 μm.

As such, the convex portion 70 having a given height and a given width can be formed on the flat face of the contact glass 41. Further, the convex portion 70 may have a given length extending in a main scanning direction. Accordingly, the convex portion 70 has a given height, a given width, and a given length, which can be determined based on a design concept.

Further, the document scan position P, which is set in the document lifted portion, can be aligned with the contact image sensor 60. Further, the document lifted portion is a portion of the document G, which is in a non-contact condition relative to the flat face of the contact glass 41, wherein the document lifted portion is set between the corner-portion of the convex portion 70 and the landing position of the document G as above described.

Accordingly, foreign matter on the document face of the document G can be scraped by the convex portion 70, by which the document G having a clean face condition can be transported to the document scan position P. Further, accumulation or adhesion of foreign matter at the document scan position P can be prevented.

Such configuration using the convex portion 70 can reduce the number of process works for manufacturing while attaining the above described preferable effects for higher quality image scanning process. Accordingly, a manufacturing cost can be reduced, and such configuration can enhance image quality of scanned image, which may not be realized by a conventional configuration.

Further, the convex portion 70 may have a height of from 5 μm to 100 μm, for example, wherein such a level of height may not cause sheet jamming of the document G at the convex portion 70, by which document G can be scanned with high quality constantly.

Further, the convex portion 70 may be formed in rectangular bar shape having corner-portions at the upstream side and downstream side of the document transport direction, for example. The corner-portion exists at the upper corners of the convex portion 70.

The document face of the document G can be rubbed by the corner-portion of the convex portion 70 at the upstream side of the document transport direction when the convex portion 70 runs on the convex portion 70. Accordingly, even if foreign matter (e.g., not-fixed toner, dust) may exist or adhere on the document face, such foreign matter can be scraped by the corner-portion of the convex portion 70. Therefore, the document G having a clean face condition can be transported to the document scan position P, by which the document G can be scanned with high quality.

Figure 6:
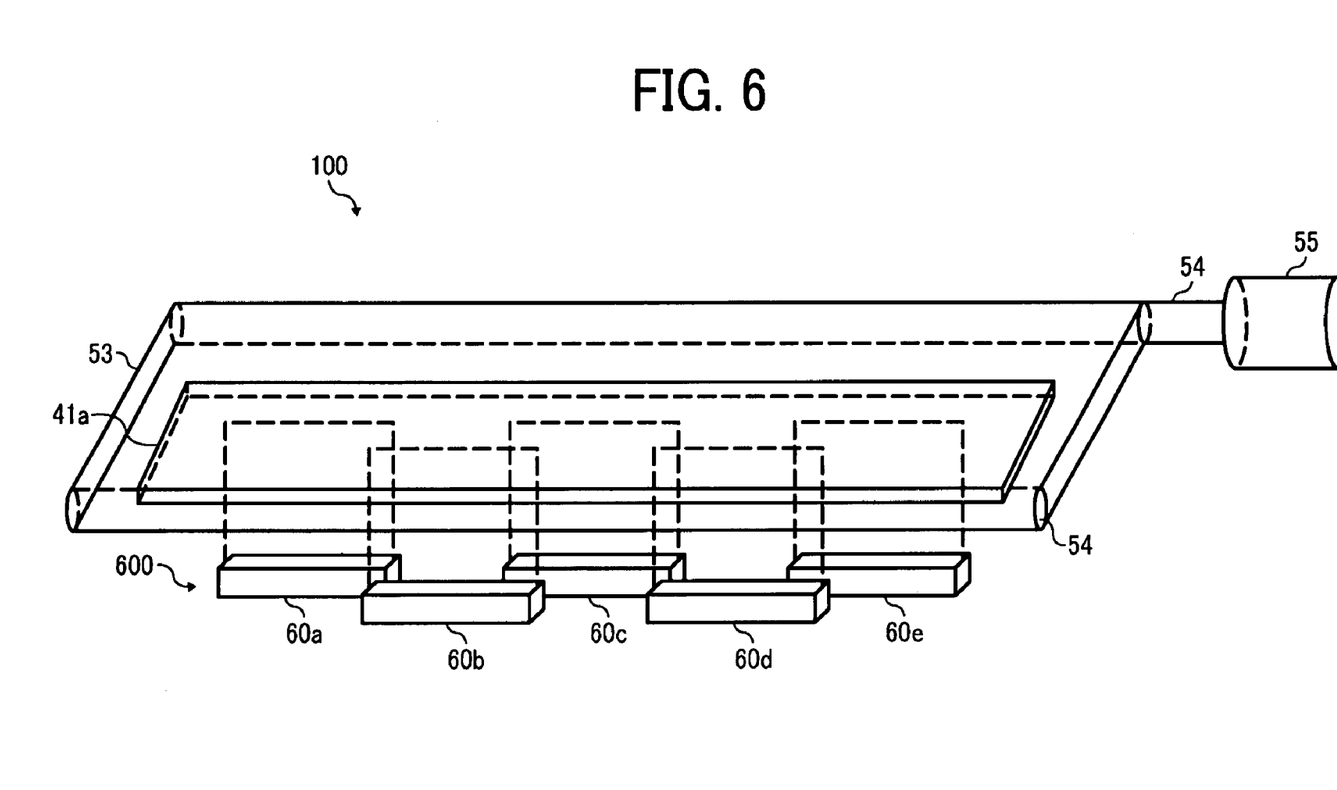
FIG. 6 illustrates a perspective view of a contact glass and a contact-type image sensor according to a second exemplary embodiment.
Figure 7:
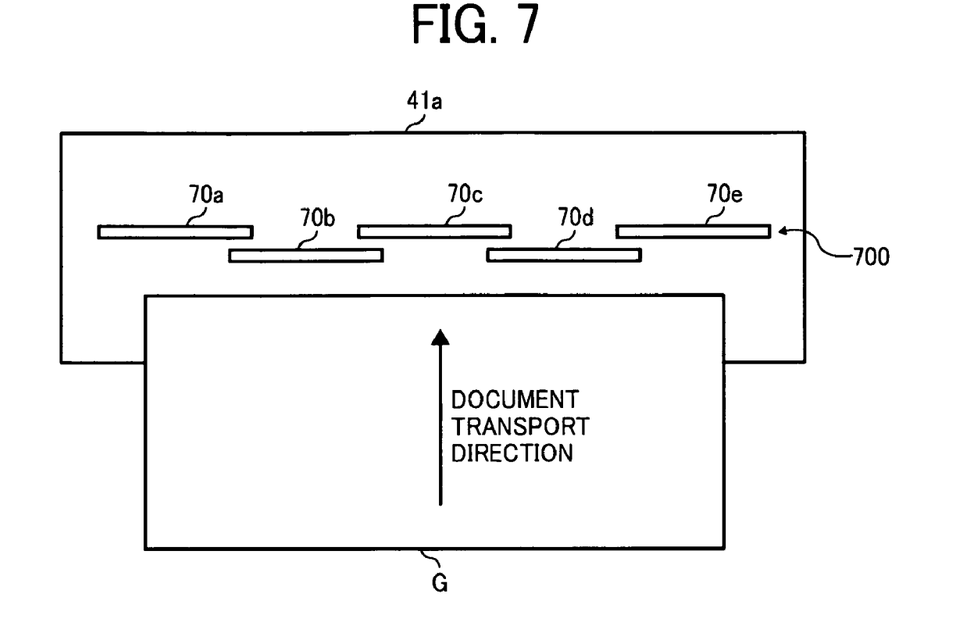
FIG. 7 illustrates a plan view of the contact glass of FIG. 6.

A description is now given to an image scanning unit according to a second exemplary embodiment with reference to FIGS. 6 and 7. FIG. 6 shows a perspective view of a configuration of a contact glass and a contact-type image sensor of the image scanning unit according to a second exemplary embodiment. FIG. 7 is a plan view of a contact glass shown in FIG. 6. The second exemplary embodiment may have elements similar to the first exemplary embodiment, which may be attached with same references numbers or characters.

FIG. 6 shows a configuration of a contact image sensor 600 of the image scanning unit 100 according to a second exemplary embodiment. As shown in FIG. 6, the contact image sensor 600 is disposed under a contact glass 41*a* of the image scanning unit 100 to scan images of the document G transported from the sheet feed table 508. The contact image sensor 600 may be arranged in a given position where the document G contacts the contact glass 41*a*.

The contact image sensor 600 includes a plurality of sub-contact image sensors. For example, the contact image sensor 600 includes five sub-contact image sensors 60*a* to 60*e* in FIG. 6, but not limited to such number. The sub-contact image sensor 600*a* to 60*e* are arranged in a staggered manner each other, in which each of the sub-contact image sensor 600*a* to 60*e* are shifted in a sub-scanning direction for a given distance, and adjacent image sensors of the sub-contact image sensor 600*a* to 60*e* are overlapped with a given length in a main scanning direction as shown in FIG. 7. By overlapping adjacent image sensors of the sub-contact image sensor 600*a* to 60*e*, image scanning can be conducted without any gap between the adjacent image sensors, and the images at the overlapped portion may receive a given image processing so that the overlapped portion can be processed as one image having no unnaturalness of image.

As shown in FIG. 7, the contact glass 41a is provided with a plurality of sub-convex portions 70a to 70e on the flat face of the contact glass 41a. Each of the sub-convex portions 70a to 70e is corresponded to the document scan position P for each of the sub-contact image sensors 60a to 60e. Accordingly, as the sub-contact image sensors 60a to 60e are collectively used as the contact image sensor 600, the sub-convex portions 70a to 70e are collectively used as a convex portion 700. Accordingly, the number of the sub-contact image sensors 60a to 60e and the number of the sub-convex portions 70a to 70e are matched each other.

As similar to the convex portion 70 shown in FIGS. 4 and 5, each of the sub-convex portions 70a to 70e may be shaped in a rectangular bar shape having corner edges, in which the corner edges face an upstream side and a downstream side of document transport direction.

As similar to the contact image sensor 60 shown in FIG. 4, each of the sub-contact image sensors 60a to 60e includes the light source 61, the lens 62, and the image sensor 63, for example, which are encased in a casing. The light source 61 emits a light beam to the document scan position P on the document G via the contact glass 41a. A reflected light reflected from the document G is focused on the image sensor 63 using the lens 62. The image sensor 63 converts the light to electrical signal to read information of document image.

As similar to the first exemplary embodiment (refer to FIG. 5), the document scan position P is placed at a downstream side of the document transport direction for each of the sub-convex portions 70a to 70e. The document scan position P can be set at a position between the corner-portion of each of the sub-convex portions 70a to 70e at a downstream side of the document transport direction and a landing position of the document G that the document G lands on the flat face of the contact glass 41a. Accordingly, the document G is in a non-contact condition relative to the flat face of the contact glass 41 between the corner-portion of each of the sub-convex portions 70a to 70e and the landing position of the document G. Such non-contact portion of the document G may be referred as a document lifted portion. Because the document scan position P can be set at a position corresponding the document lifted portion of the document G, foreign matter (e.g., not-fixed toner, dust) on the document G may not adhere the document scan position P, by which images can be scanned with higher quality while reducing occurrence of abnormal image (e.g., streak-like image) caused by foreign matter.

Further, as similar to the first exemplary embodiment, each of the sub-convex portions 70a to 70e may be formed to have a given height which can prevent an out-of-focus condition for image scanning in view of the focal depth of the lens 62 of the contact image sensor 600.

Further, the height of the convex portion 700 may be set in view of sheet quality of the document G. Accordingly, the height of each of the sub-convex portions 70a to 70e can be set to a given height that image on the document G can be scanned with high quality for any types of sheet quality without causing out-of-focus condition. For example, the height of the sub-convex portions 70a to 70e may be set from 5 μm to 100 μm, as similar to the first exemplary embodiment.

In the second exemplary embodiment, as above described, the sub-convex portions 70a to 70e (collectively as the convex portion 700) and the sub-contact image sensors 60a to 60e (collectively as the contact image sensor 600) are arranged in a staggered manner.

The document G is slidably transported on the contact glass 41 toward the sub-convex portions 70a to 70e, in which a document face of the document G faces the contact glass 41. When a leading edge of the document G reaches the sub-convex portions 70a to 70e, the leading edge of the document G is lifted from the flat face of the contact glass 41 by the sub-convex portions 70a to 70e. Then, the leading edge of the document G passes over the sub-convex portions 70a to 70e and lands on the flat face of the contact glass 41. The document G may land on the contact glass 41 by forming a given gradient angle set by a corner-portion of the sub-convex portions 70a to 70e at a downstream side of the document transport direction and the flat face of the contact glass 41. The gradient angle may vary depending on sheet quality of the document G.

As above described, the sub-convex portions 70a to 70e may not be arranged in one single row in the main scanning direction, but may be arranged in a staggered manner in the document transport direction. Accordingly, an entire leading edge of the document G may not reach the sub-convex portions 70a to 70e at a same timing. When some part of the leading edge of the document G may get stuck at one (or more) of the sub-convex portions 70a to 70e, other part of the leading edge of the document G may have already passed over other sub-convex portions 70a to 70e. Accordingly, such stuck part of the leading edge of the document G can be pulled by other part of the leading edge of the document G that has already passed over the sub-convex portions 70a to 70e. Therefore, the document G may not get stuck at the sub-convex portions 70a to 70e, but may smoothly runs on the sub-convex portions 70a to 70e.

As such, a plurality of the sub-convex portions 70a to 70e having a given length are formed on the contact glass 41 in the main scanning direction, and the plurality of the sub-convex portions 70a to 70e are formed in a staggered manner with a given shifted distance in the document transport direction. Further, the number of the sub-convex portions 70a to 70e and the number of the sub-contact image sensors 60a to 60e are matched each other, and the document scan position P can be set in the document lifted portion for each of the sub-convex portions 70a to 70e.

Accordingly, when the document G is transported, the leading edge of the document G may not get stuck to the convex portion 700, by which sheet jamming of the document G at the convex portion 700 can be prevented. Further, accumulation or adhesion of foreign matter at the document scan position P can be prevented, by which degradation of image quality caused by foreign matter can be prevented.

Such configuration using the convex portion 700 can reduce the number of process works for manufacturing while attaining the above described preferable effects for higher quality image scanning process. Accordingly, a manufacturing cost can be reduced, and such configuration can enhance image quality of scanned image, which may not be realized by a conventional configuration.

Figure 8:
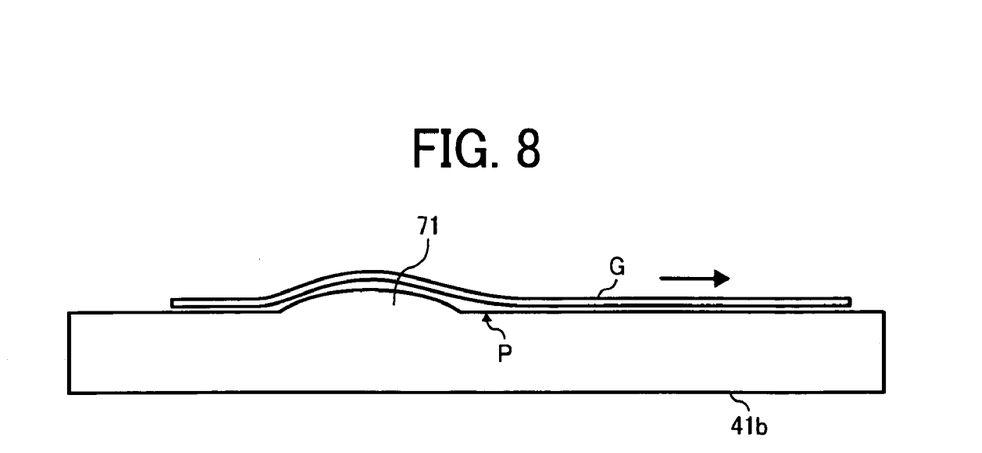
FIG. 8 illustrates an expanded view of convex portion of a contact glass in which the convex portion has a sloped shaped according to a third exemplary embodiment.

Although the convex portion 70 or the sub-convex portions 70a to 70e are shaped in a rectangular bar shape having corner edges at an upstream side and downstream side of a document transport direction as shown in FIGS. 4 and 5, the shape of convex portion may not be limited thereto. For example, as shown in FIG. 8, a convex portion 71 having a smooth portion at an upstream side and downstream side of the document transport direction can be used as a third exemplary embodiment. Such convex portion 71 may be shaped in a sloped-shape, which may resemble to a mountain shape.

When such convex portion 71 is formed on a contact glass 41b, the document scan position P can be set at a downstream side of the document transport direction relative to the convex portion 71 as shown in FIG. 8. Specifically, the document scan position P is set at a position between the convex portion 71 at a downstream side of the document transport direction and a landing position of the document G that the document G lands on the flat face of the contact glass 41b. Accordingly, the document G is in a non-contact condition relative to the flat face of the contact glass 41b between the convex portion 71 and the landing position of the document G. Such non-contact portion of the document G may be referred as a document lifted portion. Because the document scan position P is set at a position corresponding the document lifted portion of the document G, foreign matter (e.g., not-fixed toner, dust) on the document G may not adhere the document scan position P, by which images can be scanned with higher quality while reducing occurrence of abnormal image (e.g., streak-like image) caused by foreign matter.

Even when the convex portion 71 is used, the document G may not go down along a down slope of the convex portion 71 at a downstream side of the document transport direction. Specifically, the document G goes down the convex portion 71 while the document G is lifted from the convex portion 71 for some height due to stiffness of sheet quality of the document G, by which a document lifted portion can be formed, and the document scan position P can be set in the document lifted portion.

Such convex portion 71 having sloped shape can effectively prevent sticking of the leading edge of document G at the convex portion 71, by which a transportation performance of document G can be enhanced and an image scanning performance can be enhanced.

When the convex portion 71 having sloped shape is formed, a height of the convex portion 71 may be determined in view of the focal depth of the lens 62 as similar to the first and second exemplary embodiments using the contact image sensor 60 and the sub-contact image sensors 60a to 60e, respectively.

As above described, an image scanning unit including an optical scanning device fixed at a given position according to exemplary embodiments can effectively scan image of document transported in a given direction.

As above described, such image scanning unit can be manufactured by reducing the number of process work for manufacturing, and such image scanning unit can enhance image quality of scanned image by reducing an effect of foreign matter.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An image scanning unit, comprising:
   a translucent member having a flat face on which a document is contactingly transported;
   a transport unit to transport the document on the flat face of the translucent member while contacting the document against the translucent member; and
   a scan device to scan image information of the document transported by the transport unit at a scan position of the image scanning unit, fixedly disposed on a side of the translucent member opposite a side on which the document contacts the flat face of the translucent member and extending in a main scanning direction perpendicular to a transport direction of the document longer than a width of the document to be scanned,
   wherein the translucent member includes a convex portion extending in a main scanning direction to lift the document transported by the transport unit from the flat face of the translucent member as the document passes the convex portion,
   the scan device scans the document at the scan position when the document transported by the transport unit passes over the convex portion and is still lifted from the flat face of the translucent member by the convex portion,
      the convex portion of the translucent member, includes a plurality of convexities arranged in the main scanning direction and staggered in the document transport direction, and
      the scan device includes a plurality of scanners whose number matches the number of convexities at the document lifted portion of each of the convexities, and the document lifted portion is used as the scan position.

2. The image scanning unit according to claim 1, wherein the convex portion has a height of from 5 μm to 100 μm.

3. The image scanning unit according to claim 1, wherein the convex portion is shaped in a rectangular bar shape having corner-portions at its upper side facing an upstream side and a downstream side of the document transport direction.

4. The image scanning unit according to claim 1, wherein the convex portion has a sloped face at least on the upstream side of the document transport direction.

5. An image scanning unit, comprising:
   a translucent member having a flat face on which a document is contactingly transported;
   transport means for transporting the document on the flat face of the translucent member while contacting the document against the translucent member; and
   scanning means for scanning image information of the document transported by the transport means at a scan position of the image scanning unit, fixedly disposed on a side of the translucent member opposite a side on which the document contacts the flat face of the translucent member and extending in a main scanning direction perpendicular to a transport direction of the document longer than a width of the document to be scanned,
   wherein the translucent member includes a convex portion extending in a main scanning direction to lift the document transported by the transport means from the flat face of the translucent member as the document passes the convex portion, wherein the scanning means scans the document at the scan position when the document transported by the transport means passes over the convex portion and is still lifted from the flat face of the translucent member by the convex portion,
      the convex portion of the translucent member, includes a plurality of convexities arranged in the main scanning direction and staggered in the document transport direction, and
      the scan device includes a plurality of scanners whose number matches the number of convexities at the document lifted portion of each of the convexities, and the document lifted portion is used as the scan position.

* * * * *